N. FROST.
TRAP.
APPLICATION FILED OCT. 12, 1908.

922,126.

Patented May 18, 1909.

WITNESSES
J. A. Brophy

INVENTOR
Nathaniel Frost
BY Munn & Co
ATTORNEYS

UNITED STATES PATENT OFFICE.

NATHANIEL FROST, OF BLOOMINGTON, ILLINOIS, ASSIGNOR TO AMERICAN FOUNDRY AND FURNACE CO., OF BLOOMINGTON, ILLINOIS.

TRAP.

No. 922,126.   Specification of Letters Patent.   Patented May 18, 1909.

Application filed October 12, 1908. Serial No. 457,267.

*To all whom it may concern:*

Be it known that I, NATHANIEL FROST, a citizen of the United States, and a resident of Bloomington, in the county of McLean and State of Illinois, have invented a new and Improved Trap, of which the following is a full, clear, and exact description.

The object of the invention is to provide a new and improved trap for urinals, range closets and the like, which is very effective in operation, and arranged to permit convenient removal of the trap for cleaning, repairing and other purposes.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1:
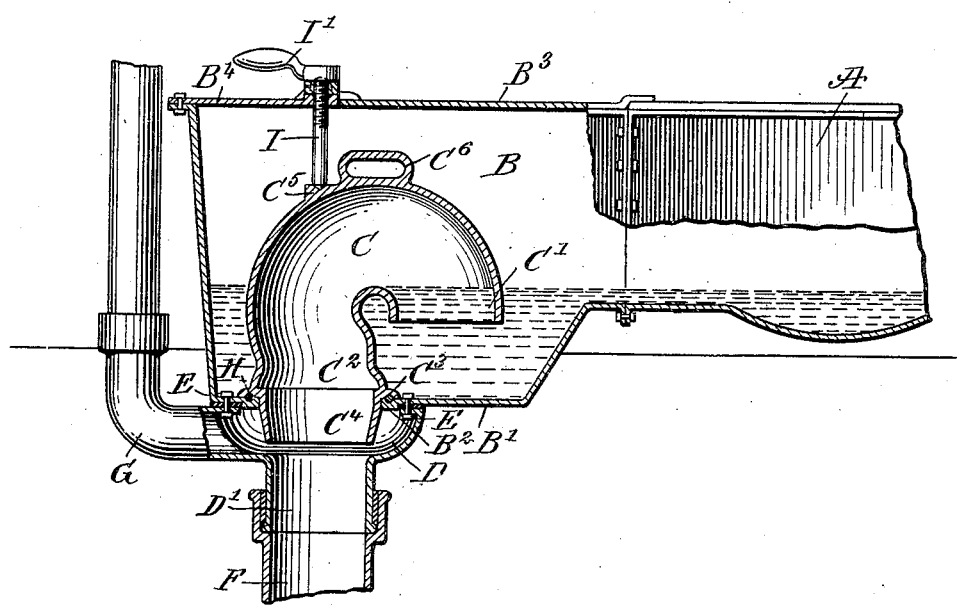
Figure 2:
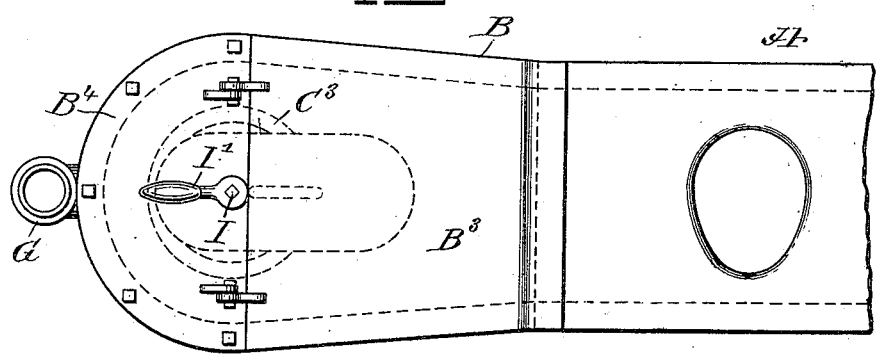

Figure 1 is a sectional side elevation of the improvement as applied to a range closet; and Fig. 2 is a plan view of the same.

The urinal, range closet or latrine A terminates in a sewage receiving box B, the bottom B' of which is a distance below the entrance of the closet A to the box B, as plainly indicated in Fig. 1. Within the sewage receiving box B is held a trap C, the body of which is made U-shape, and the entrance end C' extends into the sewage contained in the bottom B' of the box B, so as to seal the entrance end C'. The outlet leg $C^2$ of the trap C is provided with an exterior annular flange $C^3$, seated on the bottom B' and extending a distance from the terminal of the said leg $C^2$, so as to provide a trap outlet pipe $C^4$, which extends through an opening $B^2$ formed in the bottom B' of the sewage receiving box B.

The trap outlet pipe $C^4$ extends into a ventilating chamber D, preferably of bowl shape, and fastened by bolts E or other means to the under side of the bottom B', and the bottom of the ventilating chamber D is provided with an integral discharge pipe D' for connection with the sewer pipe F. From the side of the ventilating chamber D extends an air-ventilating pipe G, for carrying off the odors and obnoxious gases in the usual manner.

In order to insure a tight joint between the flange $C^3$ and the bottom B', a suitable packing or gasket H is interposed between the said parts, as plainly shown in Fig. 1.

In order to hold the trap C securely in place within the sewage receiving box B, use is made of a screw rod I, screwing in the top of the sewage receiving box B, and seated on a suitable seat $C^5$ formed on the top of the trap C. The outer end of the screw rod I is provided with a suitable handle I', to permit the operator to conveniently turn the screw rod I, with a view to engage the same with the seat $C^5$ or to disengage the said seat whenever it is desired to remove the trap C from the sewage receiving box B for repairs or other purposes.

The trap C is adapted to be lifted out of the sewage receiving box B through an opening in the top of the said box, and which is normally closed by a cover $B^3$, preferably hinged to a fixed top part $B^4$, in which screws the screw rod I. A handle $C^6$ is integrally formed on the top of the trap C adjacent to the seat $C^5$, to permit the operator to take convenient hold of the trap C when lifting the same out of the sewage receiving box B or replacing the trap therein.

From the foregoing it will be seen that by the arrangement described, a seal is had in the trap C at the inlet end C', and ventilation is provided by the ventilating chamber D, and free discharge of the sewage from the trap C is had into the sewer pipe F by way of the trap outlet $C^4$ and the discharge pipe D' of the ventilating chamber D.

Having thus described my invention, I claim as new and desire to secure by Letters Patent:

1. A urinal, range closet and the like, comprising a sewage receiving box provided in its bottom with an opening, a trap removably held on the said bottom and having an outlet extending through the said opening, the inlet end of the trap being adapted to extend into the sewage contained in said box to seal said inlet end, and a ventilating chamber on the under side of the said bottom and having an outlet in its bottom and into which extends the said trap outlet in alinement with the outlet of the ventilating chamber.

2. A urinal, range closet and the like, comprising a sewage receiving box provided in its bottom with an opening, a trap removably held on the said bottom and having an outlet extending through the said opening, and a ventilating chamber on the under side of the said bottom and into which extends the said trap outlet, the said ventilating chamber being bowl shape, and having a ventilating pipe at one side and a discharge pipe at the bottom for connection with the sewer pipe.

3. A urinal, range closet and the like, comprising a sewage receiving box provided in its bottom with an opening, a trap removably held on the said bottom and having an outlet extending through the said opening, and a ventilating chamber on the under side of the said bottom and into which extends the said trap outlet, the said ventilating chamber being bowl shape and having a ventilating pipe at one side and a discharge pipe at the bottom for connection with the sewer pipe, the said trap outlet terminating a distance from the bottom of the said ventilating chamber directly opposite the said discharge pipe.

4. A urinal, range closet and the like, comprising a sewage receiving box provided in its bottom with an opening, a trap removably held on the said bottom and having an outlet extending through the said opening, a ventilating chamber on the under side of the said bottom and into which extends the said trap outlet, and a handle on the top of the said trap for lifting it out of the said sewage receiving box.

5. A urinal, range closet and the like, comprising a sewage receiving box, provided in its bottom with an opening, an inverted U-shaped trap removably held on the said bottom and having an outlet extending through the said opening, the said trap having a flange resting on the bottom of the sewage receiving box, and a screw screwing in the top of the said sewage receiving box and abutting against the top of the said trap.

6. A urinal, range closet and the like, comprising a sewage receiving box provided in its bottom with an opening, an inverted U-shaped trap removably held on the said bottom and having an outlet extending through the said opening, the said trap having a flange resting on the bottom of the sewage receiving box, a screw screwing in the top of the said sewage receiving box and abutting against the top of the said trap, and a ventilating chamber at the under side of the bottom of the sewage receiving box and into which discharges the outlet of the said trap.

7. A urinal, range closet and the like, comprising a sewage receiving box provided in its bottom with an opening, an inverted U-shaped trap removably held on the said bottom and having an outlet extending through the said opening, the said trap having a flange resting on the bottom of the sewage receiving box, a screw screwing in the top of the said sewage receiving box and abutting against the top of the said trap, and a ventilating chamber at the under side of the bottom of the sewage receiving box and into which discharges the outlet of the said trap, the said ventilating chamber having an integral air-ventilating pipe at the side and a discharge pipe at the bottom directly opposite the terminal of the said trap outlet.

In testimony whereof I have signed my name to this specification in the presence of two subscribing witnesses.

NATHANIEL FROST.

Witnesses:
HARRY MILLER,
L. K. HEALY.